Patented Dec. 12, 1922.

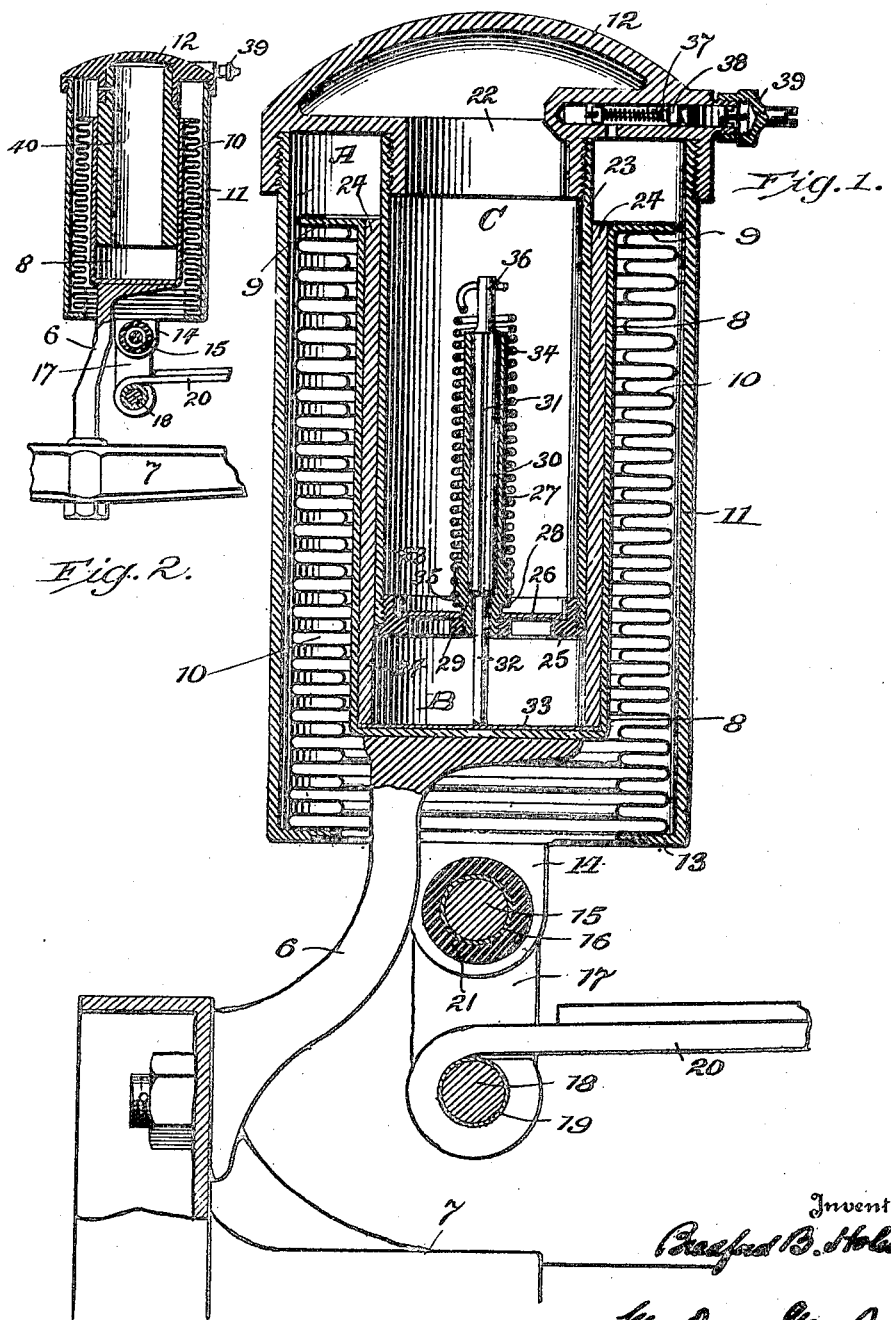

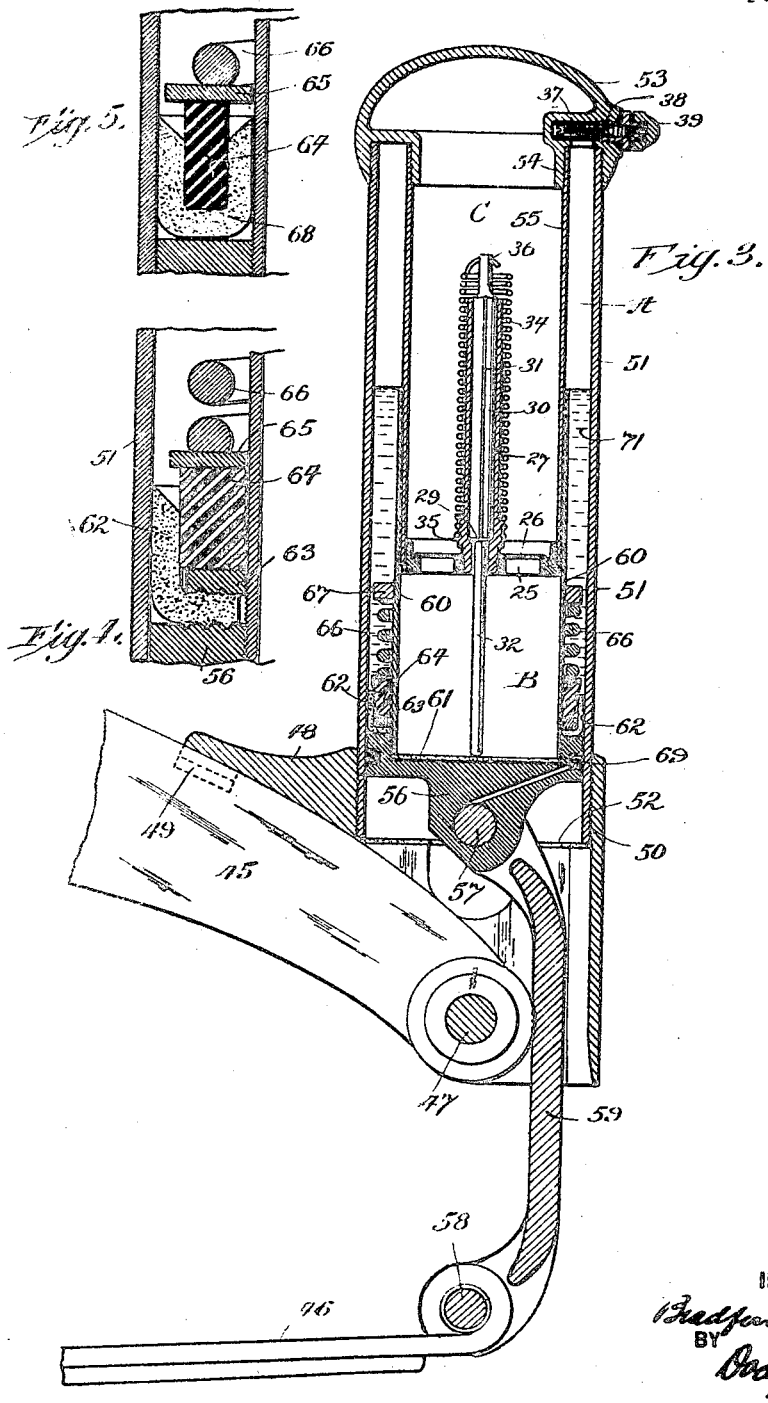

1,438,527

UNITED STATES PATENT OFFICE.

BRADFORD B. HOLMES, OF NEW YORK, N. Y.

VEHICLE AIR SPRING.

Application filed June 19, 1920. Serial No. 390,159.

*To all whom it may concern:*

Be it known that I, BRADFORD B. HOLMES, a citizen of the United States, residing at New York, in the county of New York and State of New York, have invented certain new and useful Improvements in Vehicle Air Springs, of which the following is a specification.

This invention relates to spring devices and more particularly to pneumatic cushions intended primarily for use in motor vehicle suspensions.

One object attained by the invention is the provision of a simple structure having a self-regulative function and capable of having different regulative characteristics to accommodate different vehicles. This change of regulative function is dependent on the dimensions of one element of the structure which may be manufactured at small cost and may be readily interchanged.

Another object attained by the invention is the construction of a cushion including corrugated metal bellows and characterized by the fact that the bellows are inherently self-aligning. This eliminates the use of guides for the intermediate portions of the bellows and precludes the possibility of destruction of the bellows by lateral distortion under heavy pressure.

In my prior application, Serial No. 337,953, filed November 14, 1919, there is described and claimed a cushion structure comprising two air chambers, one of which serves as a cushion or spring, and the other of which serves as a reservoir. These two chambers are normally closed from each other but are put into communication with each other by means controlled by load variations and by road irregularities. The reservoir and the cushion are initially charged with pressure fluid, and under usual conditions the air in the reservoir is under higher pressure than the air in the cushion. The total quantity of pressure fluid in the cushion and in the reservoir is constant and the device functions to transfer pressure fluid from the cushion to the reservoir by means controlled by load shocks, and to permit a reflux of pressure fluid from the reservoir to the cushion by means controlled by the riding position of the cushion in the intervals between such shocks. In the specific embodiment of the prior invention shown and described in said application, the transfer of fluid from the cushion to the reservoir is accomplished partially at least by a pump mechanism interposed in the path of communication between the two chambers. The present invention involves in common with the prior one the broad operative principle of transferring the pressure fluid from the cushion to the reservoir as the result of load shocks, and from the reservoir to the cushion as the result of the position assumed by the cushion between such shocks. The present invention differs from the prior one in the method and means used to effect the transfer from the cushion to the reservoir. In the present invention, the cushion is so designed that the cushion space, or a part thereof, is subject to sudden and extreme rises of pressure as the result of load shocks. The parts are so proportioned that these pressure peaks rise above the reservoir pressure and result in a free flow of pressure fluid to the reservoir. As in the prior invention the reflux of the pressure fluid from the reservoir to the cushion is controlled by the relative position of the parts. The present invention by eliminating the necessity for a number of valves and packed joints, conduces to the simplification of the spring structure and therefore to greater durability and efficiency.

Several practical embodiments of these inventive concepts are shown in the accompanying drawings, in which, Fig. 1 is a vertical axial section of a cushion of the bellows type, including the self-regulative mechanism and designed for use on a Ford automobile.

Fig. 2 is a similar view on a smaller scale of a cushion of the bellows type, designed for use on a Ford automobile and having no self-regulative mechanism.

Fig. 3 is a vertical axial section of a cushion of the piston type, including the self-regulative mechanism and designed for use on an automobile having a semi-elliptic spring suspension of conventional form.

Fig. 4 is an enlarged fragmentary view of the packing used in Fig. 3, and,

Fig. 5 is a similar view of a modified form of such packing.

I contemplate designing both bellows and piston types of spring for use alone or with any of the various spring suspensions and no limitation is implied to any of the specific details shown beyond such limitations as are expressly included in the claims.

In the structure shown in Fig. 1, the base bracket 6, of cast or forged steel serves as the means of attachment to the axle 7 of the machine. In this figure the rear axle of a "Ford" machine is illustrated. Brazed or welded to the bracket 6 is a drawn steel cylindrical cup 8, closed at its lower end and having an outwardly extending flange 9 at its upper end. Brazed or soldered at its upper end to this flange 9 are metallic bellows 10 which surround the cup 8 and are spaced therefrom sufficiently to assure complete clearance. The bellows 10 are shown as of the circularly corrugated type, but I contemplate the use of any equivalent type, such for example, as spirally corrugated metallic bellows.

A drawn steel tube 11 surrounds the bellows 10 and is closed at its upper end by a cast metal cap or head 12 threaded thereon and making an air-tight joint therewith. The tube 11 is formed at its lower end with an inwardly projecting annular flange 13 from the inner edge of which project downward two diametrically opposed identical lugs 14. (Only one lug 14 appears in Fig. 1, the other being forward of the plane of section.)

This construction permits the forming of these parts by an inexpensive method. A cup of proper diameter and closed at one end is first drawn. Parts of this closed end are then punched away to leave the flange 13 and two opposed ears which when bent out form the lugs 14. The holes for the shackle bolt may be formed in ears 14 in the punching operation above described or they may be drilled or punched after the ears are bent to their final form. By either procedure the finishing operations are few and simple.

The lower end of the bellows 10 is spun over the inner edge of flange 13 and is soldered or brazed thereto. A shackle bolt 15 with bushing 16 serves to connect the lugs 14 to links 17 which are in turn connected by shackle bolt 18 having bushing 19, to the leaf spring 20. The spring 20 is part of the usual Ford spring suspension and the bolts 15 and 18 may be those forming part of the regular Ford suspension. A tubular rubber buffer 21 surrounds bushing 16 to cushion extreme rebound.

The cap 12 is formed with an annular threaded boss 22. On this is threaded a tubular depending sleeve 23 which extends downward within the cup 8. Since it is desired to dispense with the use of oil in this cushion, a lubricating bushing 24 is interposed between the sleeve 23 and cup 8. This fits closely in cup 8 and sleeve 23 slides freely within and is guided by it. The fit at this point is not air-tight though close enough to retard the flow of air.

The bushing 24 may be of lignum vitæ boiled in oil, or may be an "Arguto" bushing, or may be an oilless bushing of the brass and graphite type. The particular form of the bushing is not a feature of the invention and I contemplate the use of any known self-lubricating bushing. Avoidance of the use of oil is a convenience, but the form of the cushion is not such as to forbid the use of oil in cases where such use seems expedient. The sleeve 23 of Fig. 1 would then fit in and be guided directly by cup 8, the bushing being omitted.

The lower end of sleeve 23 is internally threaded. Screwed into this lower end is a spider 25 which serves as a seat for a disk check valve 26. The valve 26 is guided by the bleed tube 27 which is threaded at its lower end through the center of spider 25 and limits the upward movement of valve 26 by means of a shoulder 28.

The bleed tube 27 is formed with a valve seat 29 against which seats the bleed valve 30. This is formed with a long and restricted bleed groove 31 and a depending stem 32 which serves to unseat valve 30 when arrested by the bottom of cup 8. A pad 33 cushions the impact of stem 32 with the head of cup 8 and a spring 34 urges the valve against its seat 29. This spring surrounds the bleed tube and is clamped at its lower end in grooves 35 formed in the bleed tube. Its upper end passes through a hole 36 in the upper end of bleed valve 30 as shown.

Air is pumped into the cushion through port 37. This is controlled by a check valve 38 which may be of the so called "Universal" type used in pneumatic tires. 39 is a valve dust-cap of conventional form.

The self-regulative action of the cushion is secured by the action of valves 26 and 30 in trapping air in the space within sleeve 23 and bleeding it back to the cushion, as will be explained in detail hereinafter. Where self-regulative action is not necessary these parts may be dispensed with.

A structure lacking these elements is shown in Fig. 2. Similar parts are similarly numbered. The sleeve 23 and valve parts carried thereby are dispensed with. A tubular guide 40 is substituted and preferably is of any of the self-lubricating types above suggested in connection with bushing 24. In Fig. 2 I show a typical front axle installation, the numeral 7 in this figure indicating a typical "Ford" front axle. In this connection I wish to call attention to the general desirability of using self-regulative cushions at the rear of an automobile where the imposed load is extremely variable, and the possibility of using non-regulative cushions at the forward end where the imposed load is less variable.

The structures shown in Fig. 1 and Fig. 2 have in common a feature of importance in all cushions of the bellows type as contradistinguished from the piston type. This feature is the subjection of the bellows to external instead of internal pressure.

Bellows subjected to internal pressure while in a straight line are in a condition of unstable equilibrium as to lateral deflection. Under increasing pressures they have increasing tendencies to bow or bulge laterally because such bowing or bulging increases the internal volume. This has required in bellows cushions as heretofore constructed either the use of very moderate pressures or the use of bellows guides to offer lateral support to intermediate portions of the bellows. The guides are difficult to construct and any cushion lacking them is not only subject to undesirable wear, but may be damaged by the use of undue pressures.

I have discovered, however, that bellows subjected to external pressure are in stable equilibrium when in a straight line. Thus they not only tend to maintain their alignment, but this self-aligning tendency is increased by increases in pressure.

A striking demonstration of this principle is the fact that metal bellows permanently distorted by lateral bulging under excessive internal fluid pressure can be permanently restored to their original form by the application of sufficient external fluid pressure.

The application of this principle to cushions of the bellows type not only permits the use of pressures hitherto considered impracticable, permitting important reductions in size, but also permits the elimination of troublesome guides and attendant complication.

While the bellows type of cushion is desirable because of its freedom from leakage, the avoidance of the use of oil and the positive exclusion of mud and dust, there are some cases where the piston type of cushion is preferable.

In order that the embodiment of the regenerative mechanism, forming part of the present invention, in a piston type of cushion may be fully set forth, and in order to show the application of such a cushion to conventional spring suspensions, I illustrate a device including these features, in Fig. 3.

In Fig. 3 the rear spring horn of an automobile is shown at 45 and the rear end of a semi-elliptic leaf spring at 46. Mounted on the rear end of spring horn 45 and held by bolt 47 is a base member 48. This is designed to fit the spring horn and has a lug 49 to engage the edge of the channel flange of the horn and hold the base member fixed in position.

The base member 48 is formed with a vertical opening which is internally threaded at the top as shown at 50, to receive the cylindrical casing 51. The lower end of casing 51 clamps an annular buffer pad 52 against a shoulder in base member 48. The upper end of casing 51 is closed by a cap 53 threaded thereto, and this cap carries a downward projecting annular boss 54 to which is threaded a downward projecting tubular sleeve 55.

A piston 56 is guided in tubular casing 51 and is connected to spring 46 by shackle bolts 57 and 58 and offset link 59. The link is offset to clear bolt 47, this construction being adopted to permit the cushion to be substituted for the strut link characteristic of present semi-elliptic spring suspensions, without requiring changes in the spring or spring-horn.

A tubular extension 60 is threaded into a recess in piston 56 and telescopes with sleeve 55. The fit between extensions 60 and sleeve 55 is fairly close but is not air tight. The extension 60 confines a buffer pad 61 in the recess in piston 56.

An annular cup leather 62, which preferably is of chrome-tanned leather, surrounds extension 60, is clamped against the top of piston 56 so as to move with the piston, and seals against casing 51. The leather may be clamped in various ways but I prefer those shown in Figs. 3, 4 and 5. In Figs. 3 and 4 a nut 63 is threaded on extension 60 and holds the leather. Above this nut is an annulus 64 of oil-proof rubber which serves as an expander for the upper edge of the cup leather. This rubber is expanded by pressure exerted through washer 65 by a spring 66. The stress on the spring is adjusted by turning nut 67 threaded in extension 60. In Fig. 5 the cup leather 68 is U-shaped in cross-section. No clamping nut is used. The rubber expander ring 64 is inserted in the channel in the leather and is expanded by washer 65, spring 66, and nut 67 as in the case of the structure of Figs. 3 and 4. In the structure of Figs. 3 and 4 the parts numbered 64, 65, 66 and 67 may be omitted if desired.

The piston 56 has an encircling groove to receive a wiper pad 69 and from this an oil duct leads to shackle bolt 57.

The sleeve 55 is internally threaded at its lower end to receive a spider 25 identical with that described with reference to Fig. 1. All the parts carried by this spider 25 are the same in form and function as similar parts numbered 26 to 36, described with reference to Fig. 1. Hence they are given the same reference numerals and need not be again described.

The filling port, valve and cap are the same as those in Fig. 1 and are designated by the same reference numerals 37, 38 and 39. This type of cushion requires a supply of oil 71 in the space between extension 60 and casing 51. This lubricates the parts, and assists the cup leather to maintain a tight joint. Loss by leakage must be made up from time to time but tests in service show that the oil is retained for several months.

After a cushion of the types shown in Figs. 1 and 3 is installed it is inflated to a pressure sufficient or only slightly more than sufficient to sustain properly the maximum load to which it is to be subjected.

On these figures I have marked three chambers A, B, and C which are functionally equivalent in the two devices. Chamber A is the main cushion chamber, chamber B serves as a dash pot, and chamber C is the regulating chamber. Chambers A and B are constantly in communication, but air-flow between them is restricted. Chambers B and C are in free communication past valve 26 when pressure in B predominates and they are in restricted communication whenever valve 30 is unseated. Consequently the inflation of the device establishes the same pressure in chambers A, B and C. When, however, the vehicle is driven, the pressure in B is subjected to violent fluctuations caused by oscillations of the parts of the device. Since flow from B to C is free while communication between A and B is retarded the effect is to increase the pressure in C at the expense of the pressure in B and A. This action diminishes and finally practically ceases when the pressure in C acting on valve 26 precludes the opening of this valve by any but the most severe rises in pressure in B.

The result of the lowered pressure in A and B is a lowered riding position of the spring. This ultimately causes stem 32 to lift valve 30 from its seat and permits air to bleed back slowly from C to B, and hence to A.

Escape of air from C to B through valve 30 does not ordinarily occur during wide oscillations of the cushion as contradistinguished from a continued low riding position. The reason for this is that when valve 30 is unseated by a heavy oscillation, the pressure in B will ordinarily be higher than that in C and valve 26 will be open to permit flow from B to C. If, however, the cushion is low in the intervals between heavy oscillations the continued holding open of valve 30 permits flow from C to B and A until pressure is raised sufficiently to elongate the cushion to its normal riding position. At this position stem 32 clears and valve 30 closes.

Chamber B has been called a dash pot, and it so acts because its clearance (except as this may be augmented by communication to chamber C) is less than the clearance of cushion chamber A. The rate of pressure rise in B is therefore much faster than in A unless relieved by flow to C and it is not so relieved if the flow to C be throttled by a high back pressure in C. This effect can be augmented by using a spider 25 having small air passages. The substitution of different spiders 25 characterized by different air port areas will change the characteristics of the cushion through a wide range. Large port area gives great flexibility while small port area gives a heavy, checking or dash pot effect. The effect of a moderate excess inflation is to increase the checking effect because it leads to high pressures in chamber C.

Having thus described my invention, what I claim is:—

1. That method of securing alignment of a convoluted bellows, elastic in the direction of its axis and substantially flexible in a direction perpendicular to its axis, which consists in guiding its ends and subjecting the intermediate convoluted walls to external fluid pressure sufficient to secure alignment.

2. That method of adjusting pressures in pneumatic cushions subject to load shocks, which consists in discharging pressure fluid from the cushion into a reservoir containing pressure fluid at a pressure higher than normal cushion pressure by a free flow from the cushion to the reservoir when cushion pressure rises above reservoir pressure as a result of load shocks, and controlling back flow from the reservoir to the cushion according to the load-sustaining positions assumed by the parts of the cushion in the intervals between shocks.

3. That method of adjusting pressures in pneumatic cushions of the type including two cushion spaces in restricted constant communication with each other, said spaces being so proportioned that one is subject to greater pressure variations for a given relative movement of the cushion parts than the other, which consists in venting air from that part in which the pressures are subject to greater variations into a closed reservoir when cushion pressure rises as the result of load shocks, and using the pressure fluid so accumulated in said reservoir to maintain the cushion pressure at the proper load sustaining intensity by regulating a back flow from the reservoir to the cushion according to the load sustaining position of the cushion during the intervals between shocks.

4. That method of controlling the action of pneumatic cushions subject to load shocks, which consists in initially charging said cushion with pressure fluid to a pressure at least sufficient to sustain the maximum load to be borne by the cushion, thereafter causing portions of said pressure fluid when highly compressed by load shocks to pass as a result of said compression into a reservoir at pressure higher than said initial cushion pressure, and controlling back flow from said reservoir to said cushion according to the load-sustaining position of said cushion in the intervals between shocks.

5. A cushion comprising, in combination, two relatively movable abutments connected together by a convoluted, metallic tube, elastic in the direction of its axis, a valved inlet to said cushion, and a charge of compressed elastic fluid within said cushion, a portion of which surrounds said elastic metallic tube.

6. A pneumatic cushion comprising, in combination, a cylinder, a plunger within said cylinder, a valved inlet to said cushion, a charge of compressed elastic fluid within said cushion, and an elastic metallic bellows one end of which is secured to said cylinder, and the other end of which is secured to said plunger, and so positioned as to be surrounded by a portion of said elastic compressed fluid.

7. A pneumatic cushion comprising, in combination, a cylinder closed at one end and open at the other, a piston within said cylinder, an elastic metallic bellows one end of which is attached to the open end of said cylinder, and the other end of which is attached to said piston for securing a leakless flexible connection between said piston and cylinder, a charge of elastic fluid under pressure within said cushion, a portion of which surrounds said bellows, and means for guiding the movement of said piston in a direction substantially coaxial with said cylinder.

8. The combination with a vehicle runnig gear, of a leaf spring, and a supplemental pneumatic spring comprising a cylinder closed at one end and attached to said leaf spring; a plunger within said cylinder, said plunger being attached to said running gear and consisting of a metallic bellows sealed at one end by an abutment and attached at the other end to said cylinder, said cylinder and plunger enclosing a substantially leakless chamber of variable volumetric capacity, a portion of said chamber surrounding said bellows, means for guiding said plunger co-axially with said cylinder, and a valved inlet to said chamber for charging it with compressed elastic fluid.

9. A pneumatic cushion comprising, in combination, an external cylinder closed at one end and an internal plunger comprising a metallic bellows closed at one end with an abutment and secured at the other end to the open end of said external cylinder, said plunger and cylinder enclosing a chamber of variable volumetric capacity for the reception of a compressed elastic fluid.

10. A pneumatic cushion comprising, in combination, an external cylinder closed at one end and an internal plunger comprising a metallic bellows closed at one end with an abutment and secured at the other end to said external cylinder, said plunger and cylinder enclosing a chamber of variable volumetric capacity for the reception of a compressed elastic fluid, and means for guiding said plunger within said cylinder.

11. The combination of a pneumatic cushion having relatively movable parts, a closed reservoir; a check valve serving to permit free flow of pressure fluid from the cushion to the reservoir when cushion pressure rises above reservoir pressure; and a valve responsive to the load-sustaining position of the parts of the cushion serving to control restricted flow between said reservoir and cushion.

12. The combination of a pneumatic cushion including two chambers of variable volumetric capacity, said chambers being in constant but restricted communication with each other and one chamber varying in volume at a greater rate than the other as the parts of the cushion move; a closed reservoir; a check valve permitting a free flow of pressure fluid from the chamber of rapid volume variation to said reservoir when the pressure therein rises above reservoir pressure; and a valve mechanism responsive to the load-sustaining position of parts of the cushion and serving to control restricted flow between said reservoir and said cushion chambers.

13. A pneumatic cushioning device comprising, in combination, a cylinder and a plunger consisting of a metallic bellows secured at one end to an abutment and at the other end to said cylinder, means for guiding said plunger co-axially with said cylinder; an auxiliary fluid pressure chamber; means operable by relative movement of said cylinder and plunger for forcing fluid from said cushion into said auxiliary chamber; and means operable by the relative position of said plunger and cylinder for venting fluid from said chamber into said cushion.

14. A pneumatic cushioning device comprising, in combination, an external cylinder, an internal bellows, a cup-shaped abutment, said parts forming a cushion, an auxiliary fluid pressure chamber forming a part of said cylinder, said chamber being in sliding engagement with said cup-shaped abutment and forming guiding means for guiding said abutment co-axially with said cylinder, a check valve serving to admit pressure fluid into said chamber from said cushion, and a valve controlled by the relative positions of said auxiliary chamber and said cup-shaped abutment and serving to vent pressure fluid from said chamber into said cushion.

15. In a pneumatic cushioning device, the combination of a main chamber of varying volumetric capacity; a secondary chamber of varying volumetric capacity whose volume changes at a different rate than the volume of said main chamber under compressive and expansive movements of said cushion; a constantly open restricted means of communication between said chambers; an auxiliary chamber of fixed volumetric capacity; and means for controlling communication between said auxiliary chamber and said secondary chamber.

16. A pneumatic cushioning device comprising, in combination, two relatively movable abutments and a metallic bellows enclosing a chamber of variable volumetric capacity; a secondary chamber of differently variable volumetric capacity; an auxiliary chamber of fixed volumetric capacity; and restricted means of communication from said secondary chamber to said main chamber and to said auxiliary chamber.

17. A pneumatic cushioning device comprising, in combination, a casing; a plunger working in said casing and forming therewith a closed cushion chamber of variable volumetric capacity; tubular shells connected with the plunger and the casing, respectively, one shell telescoping within the other and the shells together forming within said casing a second chamber of variable volumetric capacity in restricted but constant communication with the first chamber; a check valve mounted in the end of the inner shell and opening to permit flow to the interior of said shell; and a second valve serving to control a restricted reverse flow and operable by said plunger.

18. A pneumatic cushioning device comprising, in combination, a variable volume cushion chamber and a dash pot in constant restricted communication and both exerting a cushioning action; a regulating chamber in communication with said dash pot; a check valve for controlling the communication between said dash pot and regulating chamber and for permitting flow from the dash pot to the regulating chamber; and a regulating valve controlled by the load sustaining position of the parts of the cushion chamber serving to control return flow from the regulating chamber.

In testimony whereof I have signed my name to this specification.

BRADFORD B. HOLMES.